Figure 1:
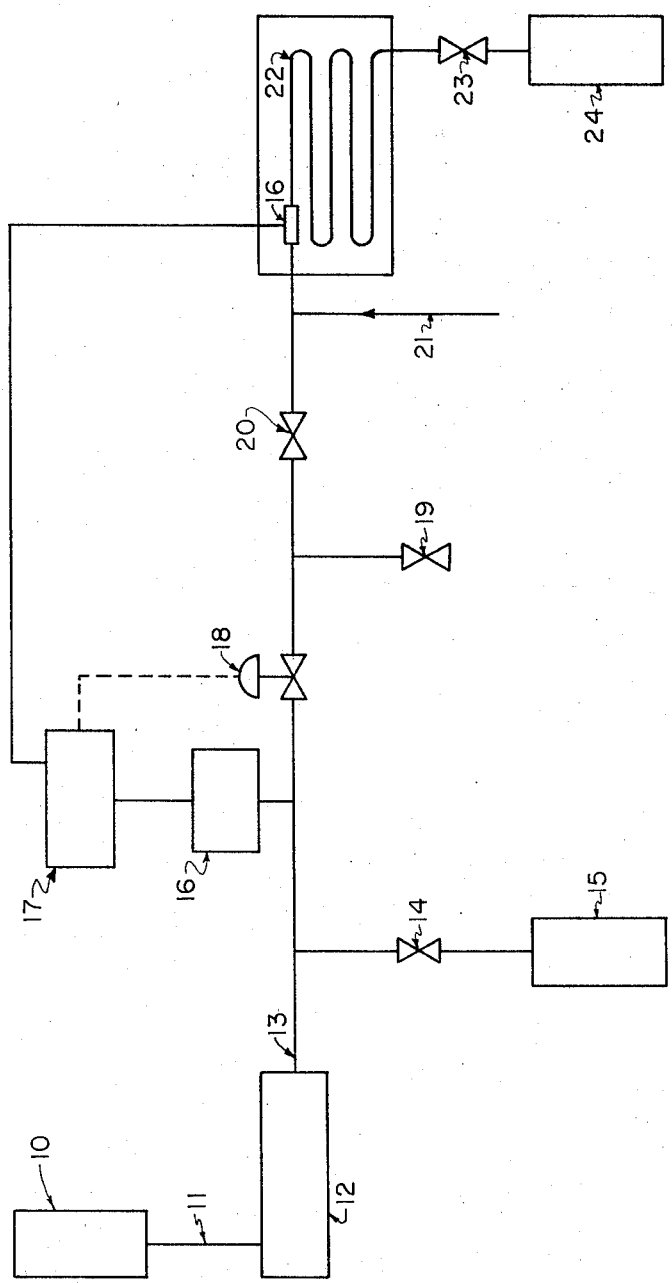

Jan. 17, 1967  R. M. DOUGLAS  3,299,033
PROCESS FOR CONTROLLING A HIGH PRESSURE POLYMERIZATION OF
ETHYLENE AND PRODUCT PROPERTIES RESULTING THEREFROM
Filed Feb. 15, 1963  2 Sheets-Sheet 1

INVENTOR.
ROBERT M. DOUGLAS
BY Fred S. Valles
ATTORNEY

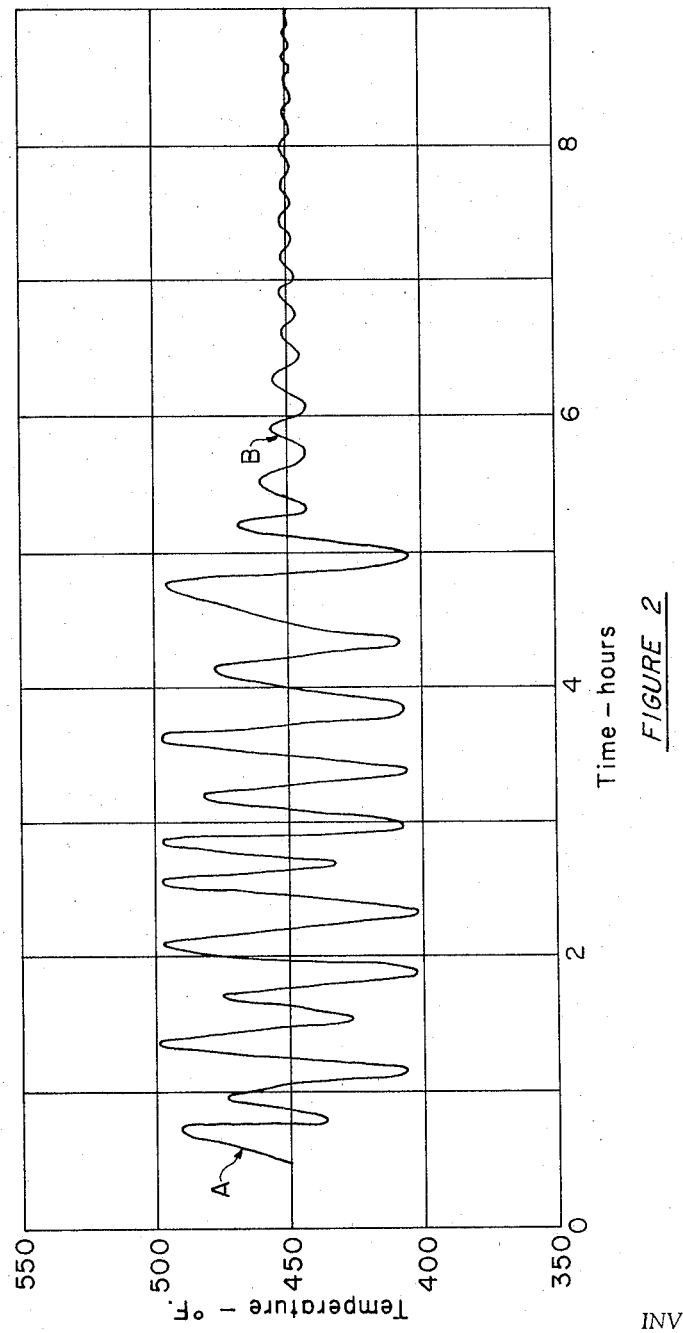

United States Patent Office 3,299,033
Patented Jan. 17, 1967

3,299,033
PROCESS FOR CONTROLLING A HIGH PRESSURE POLYMERIZATION OF ETHYLENE AND PRODUCT PROPERTIES RESULTING THEREFROM
Robert M. Douglas, Dumont, N.J., assignor to Rexall Drug and Chemical Company, Los Angeles, Calif., a corporation of Delaware
Filed Feb. 15, 1963, Ser. No. 258,856
5 Claims. (Cl. 260—94.9)

This invention relates to a process for controlling a chemical reaction and product properties resulting therefrom and more specifically concerns a method for introducing a liquid, which can contain catalytic material dissolved therein, into a high pressure chemical reaction system whereby by substantially uniformly introducing said liquid, variations in reaction temperature are minimized and whereby chemical and physical properties of the reaction products are more uniformly controlled.

In high pressure chemical reactions exemplified by processes for polymerizing ethylene at pressures above 500 atmospheres, difficulties are encountered in controlling injection of a liquid such as a hydrocarbon liquid containing catalyst dissolved therein into a pressure zone where pressures as high as 60,000 p.s.i. may be applied to the chemical reactants. The difficulty arises, not so much in the introduction of a volume of the catalyst solution, but in controlling the volume of the solution consonant with the conditions of temperature and pressure extant in the reaction zone at the moment of introduction. For one thing, in chemical reactions of this nature, and specifically those involving polymerization of ethylene at high pressures, the pressure in the reaction zone can be subjected deliberately or fortuitously to pressure variations in the order of magnitude of several thousand pounds per square inch. Where pressure variations in the reaction zone of at least five hundred pounds per square inch occur during the reaction, it becomes extremely difficult to meter in a measured volume of catalyst solution required for the particular reaction conditions existing in the reactor. This situation is aggravated further by the fact that the liquid solvents sought to be introduced into the reaction zone are compressible at the pressures ordinarily used in such reactions. For example, although liquids are thought of as being incompressible (and they are relatively so at ordinary pressures) at the pressures used in polymerization reactions of ethylene according to known technology, liquids are, as a matter of fact, compressed. At pressures of about 30,000 p.s.i. for example, depending on the liquid and the temperature, a 10 to 12 percent decrease in volume has been noted.

Consider from the foregoing discussion that a compressible liquid is to be introduced into a reaction zone maintained at highly elevated pressures and that this liquid must be introduced in metered quantities which are correct for the particular temperature and pressure and chemical reactant existing in the reactor. Consider also that the pressure in the reactor is not steady but (for reasons to be set forth below) varies as indicated hereinabove and these pressure fluctuations are accompanied by temperature variations which ultimately affect the polymer properties. Now then, when the liquid is sought to be introduced against a head pressure of, for example, 30,000 p.s.i., this resistance must be overcome initially by applying a slightly greater pressure to the liquid to overcome the head pressure and generate fluid flow. Now, if a pressure drop occurs at this point, of for example, 2,000 p.s.i., a surge of liquid will be forced into the reactor and the volume or amount cannot be accurately controlled. Thus, in ethylene polymerizations a liquid containing catalyst dissolved therein flows in this manner to a sensitive reaction zone where conditions of temperature, pressure and percent conversion are critically controlled. The uncontrolled amount of solvent containing catalyst surging into the reactor will result in a larger quantity of catalyst than desired in the reaction zone, which thereby causes release or formation of more free radicals than is required to maintain a given temperature level, with the result that the chemical properties of the polymer are thereby affected.

After the pressure drop in the reactor as discussed above, the pressure in the reactor builds up rapidly to the normal operating level. During this build-up, the flow of liquid is diminished and may at sometimes be caused to diminish to zero because of the compressibility of the liquid at the pressures employed. This situation can be corrected however with excessive, more dilute fluid flow where the relative compressible volume change becomes negligible. Such an approach to solving the problem requires exceedingly large pumping requirements and influences the chain transfer control limitation. Temperature in the reactor which at one moment drops because of expansion of the reactants due to the pressure drop will rise due to increasing pressures and will further rise in a catalytic reaction because of an increased volume of catalyst introduced during the lower pressure surge. Temperature may also drop during the time when reduced catalyst solution or no catalyst solution is being injected during at least part of the pressure build-up in the reactor. The net effect of all the foregoing is the inabiilty to maintain a desired reactor temperature curve or profile at the catalyst injection point. In ethylene polymerization reactions a reactor temperature profile may take the form of a substantially uniformly rising curve (whether steep or gradual or with controlled variations), followed by a gently falling or uniform cooling section.

All of the above temperature and pressure variations can occur in a few seconds so that control of the reaction according to plan is further complicated.

The pressure variations within the reactor alluded to hereinabove can result from a variety of reasons. One reason is that reactants such as ethylene are pumped into a reaction zone by high pressure compressors of the piston type and these cause pressure variations during the pumping operation. Another reaction is that in some techniques of high pressure ethylene polymerizations as reported in the art, pressure variations are caused by periodically discharging the reactor contents by means of a let-down valve situated between the reactor and a catch pot. In addition to this, in tubular reactor techniques for the high pressure polymerization of ethylene, polymer builds up in the walls of the reactor and this polymer frequently dislodges from the walls and causes pressure variations to occur. Whatever reasons that cause pressure variations in a reactor (and these may occur once every few seconds or minutes), the ultimate effect is to cause variations in temperature from the desired temperature profile curve usually in excess of 20° F., that is, up to 100° F. or more, and these temperature variations affect the ultimate polymer properties as will be noted later in this specification.

In accordance with the foregoing, an object of this invention is the provision of a process for substantially uniformly injecting a liquid into a high pressure reaction zone.

Another object of this invention is the provision of a technique for substantially uniformly controlling the flow of a catalyst solution into a high pressure reaction zone which is subject to pressure variations from the normal operating pressure.

A further object of this invention is to make use of the pressure variations in a high pressure reaction zone to control catalyst solution injection into said zone.

A still further object of this invention is the provision of a process for substantially uniformly injecting a catalyst solution into a high pressure reaction zone wherein average temperature variations are used as means for controlling the volume of catalyst solution to be injected.

A still further object of this invention is to provide a process for substantially uniformly controlling the injection of an initiator solution into a high pressure ethylene polymerization zone.

An important object of the invention, taking into consideration the foregoing, is the manufacture of polyethylene by a high pressure process by providing a technique for controlling the reaction conditions in a reactor zone whereby polymer properties, both physical and chemical, can be more readily controlled.

In accordance with the foregoing objects of this invention, there is provided, in a preferred embodiment of this invention, a process for substantially uniformly injecting a controlled volume of a liquid through a line into a chemical reaction zone maintained at normal operating pressures of at least 7500 p.s.i. wherein the pressure in said zone is subject to periodic variations of a magnitude of at least 500 p.s.i. which comprises providing means for applying and maintaining a pressure on said liquid in said line greater than the normal operating pressure extant in the reaction zone, valve means situated on said line for continuously controlling the volume of liquid to said reaction zone, control means associated with said valve means, said control means being responsive to said periodic pressure variations to partially open or close said valve means. By opening or closing (partially) the valving means, it is possible to maintain a predetermined substantially continuous injection rate of liquid into the high pressure reaction zone.

An alternate embodiment of this invention involves the employment of temperature sensing means in the high pressure chemical reaction zone and valve means associated therewith, said valve means being employed to control initiator liquid flow into the reaction zone, and valve means for maintaining a pressure differential between the reaction zone and the liquid initiator injection line.

In the description of the process of this invention, the term, "substantially uniformly injecting a controlled volume of a liquid" is intended to mean that although there might be some instantaneous variations in the volume of liquid being injected into a high pressure reaction zone, in general, the volume being introduced is improved in kind over the prior techniques of injecting the liquid without the process of this invention. By "normal operating pressures," it is to be understood that the average operating pressure of a reactor is predetermined, for example, at 20,000, 25,000 or 30,000 p.s.i. The reactions are, therefore, carried out at an intended predetermined pressure and it is during operation at this predetermined pressure that the variations in pressure occur as described above. By the term "initiator" is meant a free radical initiating peroxide or peroxides, such as organic and inorganic peroxides ordinarily used in initiating an ethylene polymerization reaction. Where oxygen is used as an initiator, and is introduced to the reactor in a liquid through an initiator line such as line 13 of the attached drawing, then the term initiator also includes such composition. The term "temperature profile," as well as other terms will be defined in the body of the specification.

The process of this invention is applicable generally to chemical reactions conducted at extremely high pressures, for example, from 500 atmospheres up to 20,000 atmospheres (from 7500 p.s.i. to 30,000 p.s.i., more usually, at pressures between 15,000 to 100,000 lbs./sq. in.). In a more specific sense, this invention is applicable to the high pressure polymerization of ethylene at pressures of from 15,000 p.s.i. to 60,000 p.s.i. in reactors exemplified by autoclaves (stirred tanks) or tubular reactors wherein the ratio of the diameter of the tube to the length can vary between 1:1000 to 1:100,000. Tubular reactors of this type are constructed of pressure resistant materials to withstand the high pressures occurring during the reaction. In ethylene reactions temperatures of from 225° to 600° F. can be employed.

Although the process of this invention is applicable generally as stated above to high pressure chemical reactions, it is specifically adaptable to a continuous process for polymerizing ethylene at pressures in the order mentioned employing a long tubular reactor. The process of this invention will be described with reference to such a high pressure ethylene polymerization technique.

The attached drawings, FIGURES 1 and 2, which form a part of this invention, are incorporated herein by reference and illustrate simplified apparatus (FIGURE 1) for carrying out the process of this invention and a time-temperature chart (FIGURE 2) depicting an ethylene polymerization reaction.

With regard to FIGURE 1, there is indicated at 10 an initiator solution vessel. Initiator solution is taken by line 11 to intensifier 12 and pumped through line 13 to the reactor. Provided in line 13 is valve 14 and surge tank 15, the latter unit and valve arrangement serving to dampen pressure pulsations arising from the intensifier pump. Line 13 can also replace the surge tank 15 if sufficient volume is present.

Also provided in line 13 is sensing element 16 which can be a pressure sensing element or substituted by 16' a temperature sensing element in the reaction zone, depending on whether the intensifier is controlled by pressure or flow. If the intensifier is flow controlled, sensing element 16 is a pressure tap; if the intensifier is pressure controlled, sensing element 16' is a thermocouple. The sensing element 16 in the event the intensifier is flow controlled, communicates with pressure recording controller 17 to actuate pressure throttling valve 18, as will be described hereinafter. Where the intensifier is pressure controlled, sensing element 16' communicates with element 17 which is now a temperature recording controller and this actuates valve 18, which is a flow control valve. The operation of this unit will be further described. Provided immediately after valve 18 is valve 19 for diverting flow of initiator solution from the reactor (if required or desired). Valve 20 is a block valve (two way valve) and line 21 is provided for introduction of ethylene directly from the compressors (not shown) and line 13 joins this ethylene line to the reactor generally illustrated at 22. Reactor 22 is a long tube of suitable thickness to withstand the high pressures used in polyethylene manufacture. From tube 22, reaction products are discharged via let-down valve 23 to catch pot 24.

FIGURE 2 illustrates generally a temperature chart (not drawn to scale) showing temperature variations for one reactor point before and after application of the process of this invention. The temperature curve A depicts fluctuations which can occur within the reactor due to pressure variations therein of at least 1,000 lbs./sq. in. The chart does not illustrate in detail an operating run (difficult to draw), but does demonstrate the magnitude of the temperature fluctuations occurring during actual operation of a small reactor. The chart shows that temperature fluctuations in the order of 100° F. are not uncommon during an operating period of about five hours, but at considerably higher frequencies than has been indicated in the chart. Line B shows the typical temperature fluctuations after application of the process of this invention to the reactor. Line B shows that temperature fluctuations can be reduced to less than 20° F. during long continuous runs from a desired temperature level. The ultimate temperature profile can be therefore more readily controlled. By a "temperature profile," is meant the curve or line obtained by plotting a series of temperatures derived from temperature sensing elements placed along the length of the tubular reactor. Temperature profile curves can assume a variety of shapes, depending on operation of the reactor. For example, it can be a gradually rising curve which rises from, for example, the inlet temperature of the ethylene to a peak and then gradually declines. The curve may also rise steeply from the inlet temperature of ethylene to a peak and then level out gradually, or it may have controlled peaks and valleys, depending on the catalyst composition used or on the number of initiator injection points along the length of the reactor. It should be understood, therefore, that by temperature fluctuations, is meant those fluctuations which propagate along the temperature profile of the reactor and are observed at each individual location.

In the high pressure polymerization of ethylene, which includes the copolymerization of ethylene with a variation of olefinically unsaturated compounds and the use of so-called chain transfer agents including telomerization reactions, the polymerization reaction is initiated with an initiator or initiators such as lauroyl peroxide, diethylperoxide, ditertiarybutyl peroxide, ditertiary butyl peracetate, etc. For the purpose of this invention, only the polymerization of ethylene will be referenced to hereinafter, although the invention is not limited to homopolymerization techniques.

Ordinarily, the initiators which are sought to be introduced to the reactor are liquids or solids (or they can be gases) and it is expedient to dissolve these in solvents such as saturated hydrocarbons or aromatic hydrocarbons, or alcohols, for example, pentane, hexane, heptane, octane, benzene, toluene, xylenes, tertiary butyl alcohol, mineral oils, or mixtures of these. The initiator solutions are metered into the reaction zone and the polymerization of ethylene results—in part, due to the high pressures and temperature in the reaction zone and in part, due to the particular initiator injected. Pressures and temperature and amounts of initiators are critically controlled, since these variables affect the ultimate molecular structure (molecular weight distribution) and properties of the polymer. If, according to the prior art, pressure fluctuations in the reactor cause the surging of solution into the reaction zone, or stopping of the flow of the solution therein, the properties of the polymer cannot be as readily controlled. Moreover, if the temperature fluctuations resulting from pressure fluctuations and uncontrolled initiator flow rise to temperature levels in excess of, for example, 600° F., decomposition can occur within the reactor. Without control of the initiator solution, it is not readily possible to maintain high operating temperatures, for example, 550° F., since temperature fluctuations would rise to dangerously high levels. As will be seen hereinafter, by operating according to the process of this invention, temperatures as high as 550° F. to 570° F. can be employed to thereby result in increased production (increased percentage conversion of ethylene) and control of the density of the ultimate polymer. Where high densities are desired, the operating temperature can be lower (for example, 400° F.), and due to the substantial absence of temperature fluctuations, a better ultimate product is obtained.

In FIGURE 1 the intensifier illustrated at 12 is typically a double acting pump driven by a low pressure hydraulic system which pushes on a large drive piston connected to a smaller piston, the ratio of areas of these pistons being the source of intensification being developed by the pump. The intensification ratio for these systems can vary widely, depending upon the particular use and pressure for which they are to be employed. Ordinarily, these intensifiers are provided by the industry as single acting pistons or double acting pistons which reverse periodically. The intensifier of FIGURE 12 is of the double acting type, which reverses periodically. Any type of pump, however, can be used to introduce initiator solution into the reaction zone.

Intensifier line 13 is maintained at a pressure greater than the normal operating pressure. According to the process of this invention, line 13 pressure will be greater than the reactor by a pressure difference preferably equal to or higher than the reactor pressure variations. For example, where a normal operating pressure of 30,000 p.s.i. is used and the pressure variations within the reactor are of the order of 1,000 lbs./sq. in., the pressure in intensifier line 13 will be 31,000+ lbs./sq. in. The magnitude of the pressure in the intensifier line can vary, that is, in the example cited above, the pressure in the intensifier line can be 32,000 lbs./sq. in. and up to, for example, 36,000 lbs./sq. in., thereby providing a pressure differential of from 1,000 to 7,000 lbs./sq. in. between the two systems. Were the pressure in intensifier line to be maintained at the normal operating pressure, the pressure variations occurring within the reactor would, in part, overcome the pressure in the line and cause non-uniform flow of initiator solution into the reaction zone. Therefore, by maintaining a pressure differential over both the normal and fluctuating pressures in the reactor of preferably at least 1,000 lbs./sq. in., continuous flow of the metered solution to the reactor is insured. Best results are obtained by operating at pressures preferably between 3,000–5,000 lbs./sq. in. greater than normal and fluctuating pressures. It is to be understood that pressure fluctuations within the reactor can vary from a very noticeable 500 lbs./sq. in. to as high as 5,000–10,000 lbs.

To illustrate the operation of a high pressure ethylene polymerization according to this invention, the following example is offered: the initiator solvent in vessel 10 is a hydrocarbon mixture containing dissolved therein a mixture of three initiators—tertiary butyl peroxyisobutyrate tertiary butyl peracetate and ditertiary butyl peroxide in a molar ratio 1.92:1.00:1.05. Where a polymerization is to be conducted at 33,000 lbs./sq. in., the intensifier pump 12 is set to obtain a pressure on initiator line 13 of about 38,000 lbs./sq. in. Initiator flows, due to the pumping action of the intensifier, through line 13 to reactor 22. In this instance, the intensifier is under flow control, that is, suitable provisions are made, as known in the art, so that a measuresd flow of solution is pumped per stroke of the pump at the pressures used. Pressure sensing element 16 is typically a strain gauge cell (to measure pressure) and is associated with pressure recording controller 17, which can have an air or electrical signal output (dotted line in the drawing—FIGURE 1) to actuate pressure throttling valve 18 up or down, depending on the pressure fluctuations within the reactor as sensed by element 16. By this action, pressure throttling valve 18 partially opens or closes, thereby permitting the desired amount of initiator to flow into the reactor. Where, for example, the reactor is operating at 33,000 lbs./sq. in. and a pressure fluctuation of about 2,000 lbs. per square inch occurs, that is, the pressure drops this amount, the pressure tap 16 will sense a small change in line 13 and will act via the pressure recording controller 17 to partially close the pressure throttling valve 18, thereby preventing an excessive flow of initiator solution. Thereafter, when the pressure builds up to normal in the reactor, the pressure tap 16 will again act to cause pressure recording controller 17 to open pressure throttling valve 18 a sufficient amount to cause an equivalent flow of initiator to flow into the reactor with the less pressure drop across the valve. In this example, the valve trim employed for valve 18 is of the variable capillary tube type. Where the valve trim design is of a variable area type, the acoustic velocity in the valve is the controlling factor and governs the magnitude of pressure drop required to control flow.

The above example is typically illustrated in FIGURE 2 where prior to operation of the associated control means indicated above, pressure fluctuations within the reactor caused temperature variations ranging from 20–100° F. as indicated by line A. Later, with the pressure throttling valve in operation, the temperature fluctuations noted in line B varied only about 10° F. (or less) to 20° F.

In an alternate embodiment of this invention, where the intensifier is under pressure control, that is, a predetermined pressure is employed with more than sufficient initiator liquid flow capacity which is to be metered out via the now flow control valve 18, the sensing element 16' downstream of the initiator line in the reactor 22 will operate as follows: Sensing element 16' is a thermocouple which communicates with temperature recording controller 17 to partially open or close flow control valve 18, thereby metering out a required volume of liquid for operation at a desired temperature level. In this case, when a pressure drop occurs in the reactor, for example, of 2,000 lbs./sq. in., the temperature will also drop in the reactor due to the expansion of the compressed ethylene gas and decreased polymerization rate. When the temperature drops because of rapid pressure variations, it is desirable to maintain substantially constant flow of initiator solution to the reactor to maintain a desired temperature level at the point in question, and this is accomplished by maintaining a sufficient pressure differential between line 13 and the reactor across valve 18 to dampen initiator flow variations. The temperature controller 17 (controlling initiator flow) is made insensitive to instantaneous temperature variations by proper adjustment of the proportional band, but controls the average temperature drift by utilizing proper reset settings. Thus, where sensing element 16' is located in an area of the reactor where normally a temperature peak occurs (after initiator injection), for example, a temperature range of 525° to 535° F., the temperature recording controller is set to control, through valve 18, volume of initiator solution required for this temperature level. In order, however, to substantially eliminate initiator flow variations which can occur due to pressure variations, a pressure is maintained on initiator line 13 across valve 18 which is higher than the reactor pressure and reactor pressure variations, so that a desired substantially constant flow of initiator solution is maintained into the reactor. Thus, the higher pressure in line 13 dampens initiator flow variations which would otherwise occur due to the pressure variations. The pressure differential to be maintained across valve 18, as heretofore mentioned, is at least 1,000 p.s.i.

As previously indicated herein, one of the advantages of operating according to the preferred embodiment of this invention is the ability to control temperature variations at each point along a temperature profile in the reaction zone. Referring to FIGURE 2, it can be seen that if it is desired to operate at a temperature of 500° F., that this can be accomplished and line B, as shown, will not be subject to fluctuations which will carry any temperature peak beyond 10–20° F. at that point. Also as indicated, it is possible to increase conversion of the ethylene to polymer by operating at higher average temperatures. For example, a greater quantity of ethylene can be polymarized at temperatures of 500° than at 400° F. with a given feed temperature. If a particular characteristic is desired, such as a higher density material than would be produced at 500° F., then the temperature can be lowered to, for example, 400° F. and the density of the material produced will increase as is known in the art (for example, from a density of .918 to a density of .918+). It must be understood that in processing of plastics such as polyethylene, densities and melt flow are critically important and that the method of operation according to this invention lends great adaptability to a high pressure process for "tailor making" polymers for various uses. Thus, several advantages of this invention are readily apparent—

(a) Safer operations and avoidance of decomposition due to erratic temperature fluctuations.

(b) Ability to maintain a higher average temperature.
(c) Ability to increase production.
(d) Ability to change density and/or molecular weight distribution.
(e) Ability to improve control of melt index or melt flow.

There are other advantages which will be apparent from a reading of the foregoing description of this invention.

Modifications and changes can be made to the process of this invention without departing from the invention concept and the scope of the claims appended herein.

What is claimed is:

1. In a high pressure ethylene polymerization process the method for continuously injecting a controlled volume of an initiator solution through a line into a polymerization zone maintained at normal operating pressures of at least 7500 p.s.i. wherein the pressure in said zone is subject to periodic pressure variations of a magnitude of at least 500 p.s.i., the steps which comprise:

(a) applying and maintaining a pressure on said initiator solution in said line greater than the maximum operating pressure existing in the reaction zone,
(b) continuously sensing said periodic pressure variations occurring in said zone and
(c) continuously controlling the volume of initiator solution injected into said zone in response to said sensed periodic pressure variations, said control of said volume of initiator solution being effective to increase said volume introduced during a pressure decrease in said reaction zone proportional to a resulting momentary increase in ethylene flow and effective to decrease said volume introduced during a pressure increase in said reaction zone proportional to a momentary decrease in ethylene flow.

2. The process of claim 1 wherein the normal operating pressure is at least 15,000 p.s.i. and the pressure in said zone is subject to periodic variations of a magnitude of at least 1,000 p.s.i.

3. The process of claim 1 wherein the ethylene polymerization zone is an elongated tubular reactor.

4. The process of claim 1 wherein the ethylene polymerization zone is an elongated tubular reactor, the normal operating pressure is at least 15,000 p.s.i. and wherein the pressure applied and maintained on the initiator solution is between 1,000 to 7,000 p.s.i. greater than the maximum pressure in the reactor.

5. The process of claim 1 wherein the ethylene polymerization is carried out in an elongated tubular reactor at pressures of from 15,000 to 100,000 p.s.i. and at temperatures of from 225° to 600° F., the pressure in said zone is subject to periodic variations of a magnitude of at least 1,000 p.s.i. and the pressure applied and maintained on the initiator solution is between 1,000 to 7,000 p.s.i. greater than the maximum pressure in the reactor.

References Cited by the Examiner

UNITED STATES PATENTS

| 2,886,616 | 5/1959 | Mertz et al. | 196—132 X |
| 2,908,734 | 10/1959 | Cottle | 260—94.9 |
| 2,964,511 | 12/1960 | Cottle | 260—94.9 |
| 3,023,202 | 2/1962 | Schappert | 260—94.9 |

FOREIGN PATENTS 756,813   9/1956   Great Britain.

JOSEPH L. SCHOFER, *Primary Examiner.*

F. L. DENSON, *Assistant Examiner.*